United States Patent
de la Soujeole

[11] Patent Number: 6,031,807
[45] Date of Patent: Feb. 29, 2000

[54] PROGRAMMING THE INDUCTANCE OF READ/WRITE HEADS

[75] Inventor: Axel Alegre de la Soujeole, Scotts Valley, Calif.

[73] Assignee: STMicroelectronics, Inc., Carrollton, Tex.

[21] Appl. No.: 08/852,278

[22] Filed: May 7, 1997

[51] Int. Cl.[7] .................................................. G11B 5/02
[52] U.S. Cl. .......................................... 369/62; 369/67
[58] Field of Search ................................. 360/62, 61, 63, 360/66, 67, 68, 46, 39, 110, 111, 113, 124; 369/44.14, 124, 13

[56] References Cited

U.S. PATENT DOCUMENTS

| | | | |
|---|---|---|---|
| 5,150,073 | 9/1992 | Murari et al. | 330/261 |
| 5,239,433 | 8/1993 | Watanabe | 360/124 |
| 5,359,466 | 10/1994 | Fuji et al. | 360/46 |
| 5,377,055 | 12/1994 | Ishii | 360/46 X |
| 5,381,277 | 1/1995 | Jaffard et al. | 360/62 |

FOREIGN PATENT DOCUMENTS 62-65269  3/1987  Japan .

*Primary Examiner*—Muhammad Edun
*Attorney, Agent, or Firm*—Theodore E. Galanthay; Lisa K. Jorgenson

[57] ABSTRACT

A read/write head in a recording and retrieval system and method of operating the read/write head are disclosed. The read/write head contains two inductive sections coupled to a switch. During a read operation, the switch is open connecting the sections in series and maximizing the inductance of the read/write head to produce a better read operation. During a write operation the switch is closed connecting the sections are in parallel to reduce the inductance of the read/write head to produce a better write operation. The switch is controlled by the R/W_signal of the recording and retrieval system. The inductance of the inductive sections can be modified to optimize the read and write operations.

23 Claims, 2 Drawing Sheets

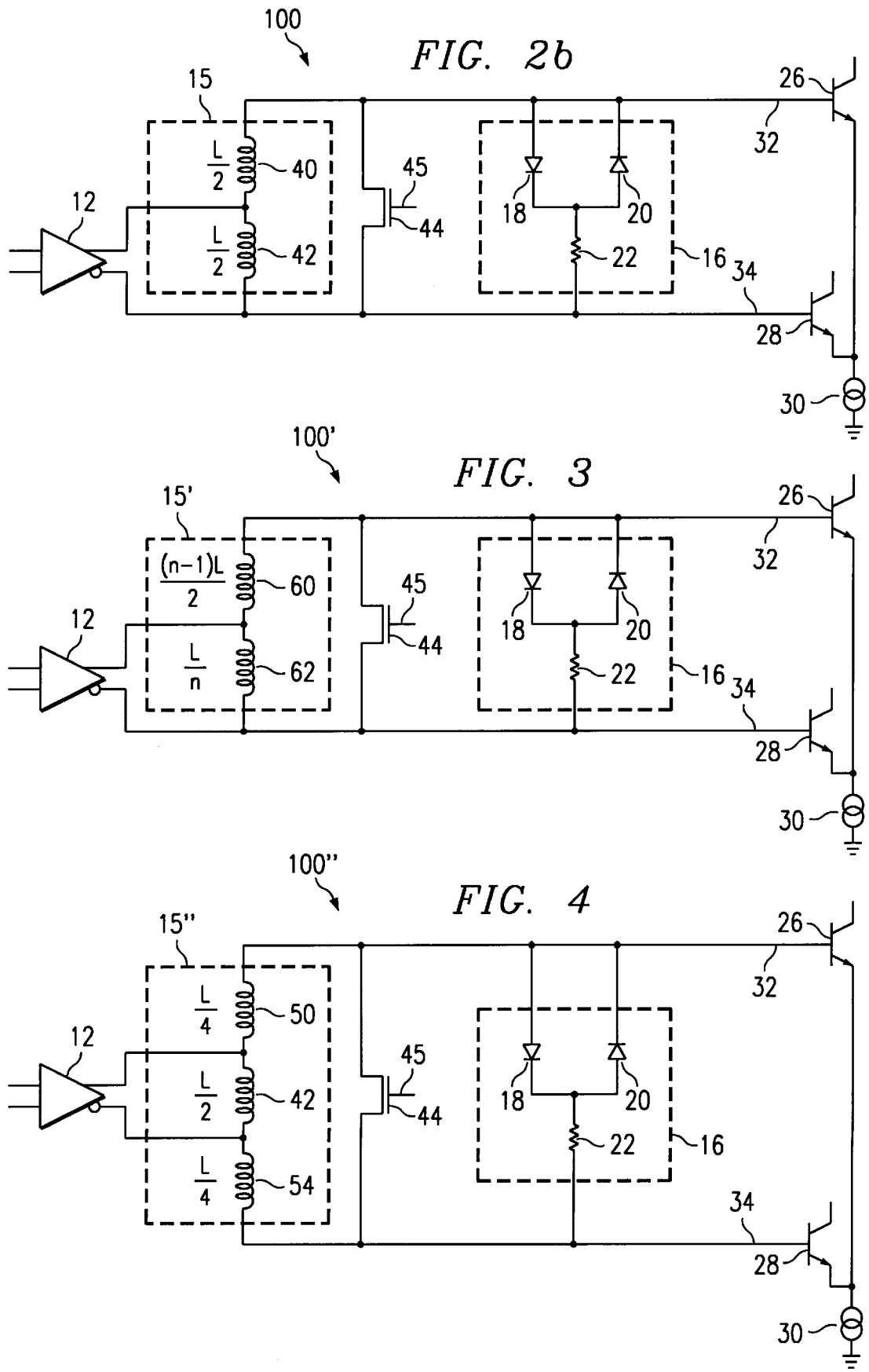

PROGRAMMING THE INDUCTANCE OF READ/WRITE HEADS

BACKGROUND

The present invention relates to improvements in magnetic data storage disc drives, and is more specifically related to an improved circuit and method for programming the inductance of read/write heads for read and write operations.

Read/write heads are popular in information recording and retrieval systems such as disc drives. Many information storage systems are designed for both the recording and the retrieval of data, and therefore require both a write and a read head. For example, conventional disc drives are used to both record and retrieve information. It is particularly advantageous to use one head, a read/write head, for both the recording and the retrieval of data. The read/write head is adapted to transfer data between the storage medium and an external system such as a computer's microprocessor.

FIG. 1a is a block diagram of a recording and retrieval system 10, hereinafter disc drive 10. The disc drive 10 contains read/write head 14 connected to a write driver 12 and to a read amplifier 25. The write driver 12 and read amplifier 25 can be on a single integrated chip 70. The read/write head 14 is positioned near a storage medium 8, such as a disc. The disc drive 10 usually has a read/write head both above and below, not shown, the storage medium. The disc drive 10 typically contains logic, such as the controller 29, usually a microcontroller, that controls the operation of disc drive 10. The disc drive 10 may also include various other circuitry, not shown.

FIG. 1b shows a schematic of the disc drive 10, having a conventional read/write head 14. The read/write head 14 is typically an inductor having an inductance L between 400 nH to 600 nH in current technology. The read/write head 14 is connected to a write driver 12 and to the differential inputs 32, 34 of the read amplifier 25 at the base of read transistors 26, 28. The emitters of read transistors 26, 28 are connected to a current source 30. The read/write head 14 is connected in parallel to a damping network 16 and a current clamp 24. The damping network 16 has a pair of diodes 18, 20, in parallel, connected in series with a resistor 22, although any conventional damping network can be used.

The problem with using the same head for both read and write operations is that the requirements for optimal read operations are diametrically opposed to the requirements for optimal write operations. To optimize the read operation the inductance L should be as large as possible. The read back amplitude is a function of the inductance L and a larger inductance L gives a stronger signal during a read operation, which gives greater accuracy in the data read. To optimize the write operation the inductance L should be as small as possible. A smaller inductance allows for a faster rise in current through the head during a write operation, which reduces the transition length on the media, therefore reducing intersymbol interference, such as bit shifts and partial demagnetization.

At best, the value of the inductance L of the read/write head is a compromise between the desire to increase the inductance L to produce the strongest signal for the read operation, and to decrease the inductance L to produce a faster current for the write operation.

To improve both the read and write operations, separate inductive elements can be used for the read and for the write. However, separate inductive elements will greatly increase the cost of the disc drive 10. Of course, cost increases are to be avoided. Furthermore, adding another inductor is particularly difficult because of the manufacturing process for multiple inductors. Additionally, because the head is an inductor and has to be an external component two connectors and two input output pads have to be added to the integrated circuit 70 for every additional head, further increasing the cost of the disc drive 10.

A further problem with using the same head for both read and write operations is that the head is connected to both the inputs of the read amplifier 32, 34 and to the write driver 12. During a write operation, the write driver 12 produces very large voltage swings across the read/write head 14. This can overstress the read amplifier 25.

One way to prevent the large voltage swings across the read/write head 14 from affecting the read amplifier 25 is to connect the current clamp circuitry 24 across the read/write head 14. The current clamp 24 is additional circuitry and increases the cost and size of the disc drive 10. Another way to prevent the large voltage swings across the read/write head 14 from affecting the read amplifier is to use different heads for the read and write operations, however, as described above, this also increases the cost of the integrated circuit 70.

SUMMARY OF THE INVENTION

A read/write head in accordance with the present invention includes a first inductive section and a second inductive section coupled in parallel responsive to a write operation, and coupled in series responsive to a read operation.

In accordance with the method of operation of the circuit of the present invention, the operating state of the recording and retrieval system containing the read/write head is determined. Responsive to the operating state being a write, the first inductive section is coupled in parallel with the second inductive section; and responsive to the operating state being a read, the first inductive section is coupled in series with the second inductive section.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

BRIEF DESCRIPTION OF THE DRAWINGS

FIG. 2b is a circuit diagram of a recording and retrieval system containing a read/write head according to an embodiment of the present invention.

FIG. 3 is a circuit diagram of a recording and retrieval system containing a read/write head according to alternative embodiment of the present invention.

FIG. 4 is a circuit diagram of a recording and retrieval system containing a read/write head according to another alternative embodiment of the present invention.

DETAILED DESCRIPTION OF THE PREFERRED EMBODIMENT

Figure 1A:
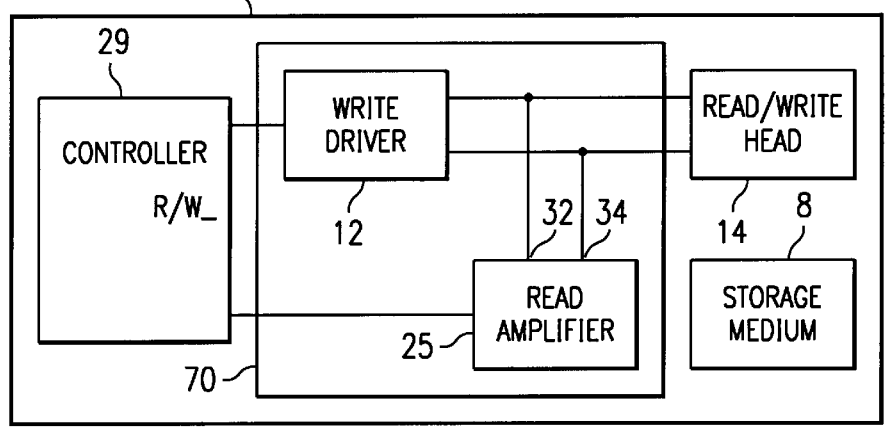
FIG. 1a is a block diagram of a recording and retrieval systems containing a conventional read/write head.
Figure 1B:
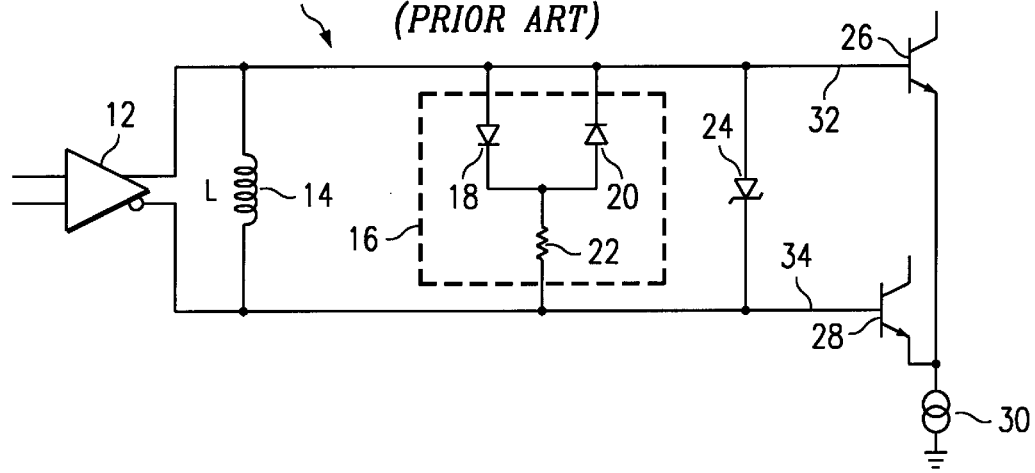
FIG. 1b is a circuit diagram of a recording and retrieval systems containing a conventional read/write head.
Figure 2A:
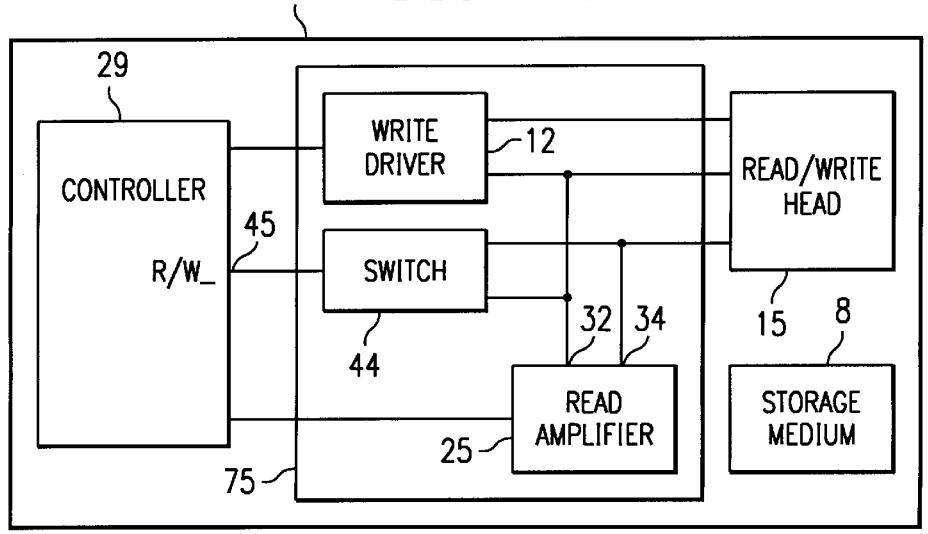
FIG. 2a is a block diagram of a recording and retrieval system containing a read/write head according to an embodiment of the present invention.

Referring to FIG. 2a, a read/write head according to an embodiment of the invention is designated generally by reference numeral 15. The read/write head 15 is typically included in a recording and retrieval system 100, such as a disk drive, hereinafter disc drive 100. The read/write head 15 is connected to a write driver 12, and a read amplifier 25. The write driver 12 and read amplifier 25 are preferably on a single integrated chip 75. The read/write head 15 is positioned near a storage medium 8, such as a disc. The disc drive 100 usually has a read/write head both above 15 and below, not shown, the storage medium 8. The disc drive 100 also typically contains logic, such as the controller 29, usually a microcontroller, that controls the operation of disc drive 100. A switch 44 is connected across the read/write head 15. The switch 44 is controlled by the signal R/W__45 generated by the controller 29. The controller 29 controls and monitors the operation of the disc drive 100 and conventional controllers 29 contain a control signal R/W__45 that indicates whether the disc drive 100 is performing a read or write operation. The disc drive 100 may also include various other circuitry, not shown. Parts common to FIGS. 1 through 4 are indicated using the same numbering system.

FIG. 2b shows a circuit diagram of the disc drive 100, having a read/write head 15 according to an embodiment of the present invention. The read/write head 15, in a manner similar to the conventional read/write head, is connected to a write driver 12 and to differential inputs 32, 34 of the read amplifier. A damping network 16 is connected across the read/write head 15. The read/write head 15 is made of first and second inductive sections 40, 42. In the preferred embodiment the first and second inductive sections 40, 42 are part of one inductor having three connections to couple it to the write driver 12 and the differential inputs of the read amplifier 32, 34. The sum L of the inductances of first and second inductive sections 40, 42 is preferably the same as the total inductance of a conventional read/write head, which is 400 nH to 600 nH in current technology. The inductance of the first and second inductive sections 40, 42 can be equal, as shown in FIG. 2b, or can differ from each other as shown in FIG. 3.

Referring again to FIG. 2b, the first connection is at the first end of the first inductive section 40 and is connected to the first differential input 32 of the read amplifier. The second connection is between the second end of the first inductive section 40 and the first end of the second inductive section 42 and is connected to the first output of the write driver 12. The third connection is at the end of the second inductive section 42 and is connected to the second differential input 34 of the read amplifier and to the second output of the write driver 12. However, each of the inductive sections 40, 42 can be a separate individual inductor, although this will increase the complexity and cost of the read/write head 15.

A switch 44, preferably a PMOS transistor, is connected across the two inductive sections 40, 42, although any conventional switch having a control element can be used. The gate of the switch 44, i.e., the control element, is connected to the R/W__45.

In operation, the disc drive 100 determines its operating state. This is typically done by the controller 29, and the result is the logic state of the R/W__45. When the first logic state, low, is on the R/W__45, indicating the disc drive 100 is in a write operation, the switch 44 is closed and the first inductive section 40 is in parallel with the second inductive section 42. This makes the inductance of the read/write read 15 during the write operation the inductance L/2 of the first inductive section 40 in parallel with the inductance L/2 of the second inductive section 42, which is equal to L/4.

The inductance of the read/write head 15 during the write operation L/4 is now ¼ of the inductance L of a conventional read/write head during the write operation. This allows for a faster rise in current through the head during a write operation, which reduces the possibility of corrupting the data during the write operation. Furthermore, because the ends of the inductor forming the read/write head 15 are connected together, the large voltage swings common in a conventional read/write head are not generated, eliminating the need for the current clamp. This reduces the amount of circuitry need for the disc drive 100, reducing its cost and size.

When R/W__45 is at the second logic state, high, indicating the disc drive 100 is in a read operation, the switch 44 is open and the first inductive section 40 is in series with the second inductive section 42. The inductance of the read/write head 15 during a read operation is the inductance L/2 of the first inductive section 40, in series with the inductance L/2 of the second inductive section 42, which is equal to L.

The inductance of the read/write head 15 during the read operation L is now the same as the inductance L of a conventional read/write head during the read operation, and 4 times its own inductance L/4 during the write operation. This produces a stronger signal during a read operation, which gives greater accuracy in the data read.

Alternatively, the inductance of each of the inductive sections can be increased from L/2. This would produce a larger inductance for the read operation, producing a more optimal read operation. When the inductance of each inductive section is less than the inductance of the conventional read/write head L this still produces a better write operation than the conventional read write head.

FIG. 3 shows an alternative disc drive 100' having a read/write head 15' that can be employed as an alternative to the read/write circuit of FIG. 2b. The read/write head 15' is similar to the read/write head 15, except the values of the first and second inductive sections 60, 62 are not equal to each other. The values of the first and second inductive sections 60, 62 are optimized for the read and write operations based on the design of the read/write head 15', the flying height of the head 15' from the storage medium, the frequency of recording, and the properties of the storage medium.

In operation, the disc drive 100' determines its operating state, typically performed by the controller 29. The result is the logic state of the R/W__45. When the first logic state, low, is on the R/W__45, indicating the disc drive 100' is in a write operation, the switch 44 is closed and the first inductive section 60 is in parallel with the second inductive section 62. This makes the inductance of the read/write read 15' during the write operation the inductance L/n of the first inductive section 60 in parallel with the inductance (n−1)L/n of the second inductive section 62, which is equal to $(n-1)L/n^2$.

The inductance of the read/write head 15' during the write operation $(n-1)L/n^2$ is now $(n-1)/n^2$ of the inductance L of a conventional read/write head during the write operation. Again, allowing for a faster rise in current through the head during a write operation, which reduces the possibility of corrupting the data during the write operation.

When the second logic state, high, is on the R/W__45, indicating the disc drive 100' is in a read operation, the switch 44 is open and the first inductive section 60 is in series with the second inductive section 62. The inductance of the read/write head 15' during a read operation is the inductance L/n of the first inductive section 60, in series with the inductance (n−1)L/n of the second inductive section 62, which is equal to L.

The inductance of the read/write head 15' during the read operation L is now the same as the inductance L of a conventional read/write head during the read operation, and $n^2/(n-1)$ times its own inductance $(n-1)L/n^2$ during the write operation. This produces a stronger signal during a read operation, which gives greater accuracy in the data read.

Alternatively, the inductance of each of the inductive sections can be increased by making n smaller than 1. This would produce a larger inductance for the read operation, producing a more optimal read operation. When the inductance of each inductive section is less than the inductance of the conventional read/write head this still produces a better write operation than the conventional read write head.

FIG. 4 shows another alternative disc drive 100" having an alternative read/write head 15". The read/write head 15" is made of a first, second, and third inductive sections 50, 42, 54. In the preferred embodiment the first, second and third inductive sections 50, 42, 54 are part of one inductor having four connections to couple it to the write driver 12 and the differential inputs of the read amplifier 32, 34. The sum L of the inductances of the inductive sections 50, 42, 54 is preferably the same as the total inductance of a conventional read/write head, which is 400 nH to 600 nH in current technology. Preferably, the inductance L/4 of the first and third inductive sections 50, 54 are equal and are half the inductance L2 of the second inductive section 42.

The first connection is at the first end of the first inductive section 50 and is connected to the first differential input 32 of the read amplifier. The second connection is between the second end of the first inductive section 50 and the first end of the second inductive section 42 and is connected to the first output of the write driver 12. The third connection is between the second end of the second inductive section 42 and the first end of the third inductive section 54 and is connected to the second output of the write driver 12. The fourth connection is at the second end of the third inductive section 54 and is connected to the second differential input 34 of the read amplifier. However, each of the inductive sections 50, 42, 54 can also be a separate individual inductor, although this will increase the complexity of the read/write head.

The switch 44 is connected across the three inductive sections 50, 42, 54. The gate of the switch 44, i.e. the control, is connected to the R/W_45.

In operation, the disc drive 100" determines its operating state, and the result is the logic state of the R/W_45. When the first logic state, low, is on the R/W_45, indicating the disc drive 100" is in a write operation, the switch 44 is closed and the first inductive section 50 is in series with the third inductive section 54, this combination is in parallel with the second inductive section 42. This makes the inductance of the read/write read 15" during a write operation the inductance L/2 of the sum of the first third inductive sections in parallel with the inductance L/2 of the second inductive section 42, or L/4.

Again, the inductance of the read/write head during the write operation L/4 is now ¼ of the inductance L of a conventional read/write head during the write operation, allowing for a faster rise in current through the head during a write operation, and reducing the possibility of corrupting the data during the write operation. Furthermore, because the end of the inductor forming the read/write head 15" are connected together, the large voltage swings common in a conventional read/write head are not generated, eliminating the need for the current clamp. This reduces the amount of circuitry need for the disc drive 100", reducing its cost and size.

When the second logic state, high, is on the R/W_45, indicating the disc drive 100" is in a read operation, the switch 44 is open and the first, second, and third, inductive sections 50, 42, 54 are in series. The inductance of the read/write head 15" during a read operation L.

The inductance of the read/write head during the read operation L is now the same as the inductance L of a conventional read/write head during the read operation, and 4 times its own inductance L/4 during the write operation. This produces a stronger signal during a read operation, which gives greater accuracy in the data read.

Alternatively, the inductance of each of the inductive sections can be increased. This would again produce a larger inductance for the read operation, producing a more optimal read operation. When the inductance of each inductive section is less than the inductance of the conventional read/write head this still produces a better write operation than the conventional read write head.

A read/write head composed of several inductive sections coupled in parallel during a write mode and in series during a read mode allows for the optimization of the read/write head for read and write operations. The inductance of the read/write head can be made smaller during a write operation to allow for a faster rise in current through the head during a write operation, which reduces the possibility of corrupting the data during the write operation. Additionally, the ends of the inductor forming the read/write head are connected together when placed in parallel, eliminating the large voltage swings common in a conventional read/write head are not generated, thus eliminating the need for the current clamp. This reduces the amount of circuitry need for the recording and retrieval system. Increasing the inductance during the read mode, produces a stronger signal during a read operation, which gives greater accuracy in the data read.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

I claim:

1. A read/write head for performing read operations from a storage medium and write operations to the storage medium, the read/write head comprising:

a first inductive section, having a first inductance;

a second inductive section, having a second inductance, coupled in parallel with the first inductive section responsive to a write operation, and coupled in series with the first inductive section responsive to a read operation.

2. The read/write head of claim 1, wherein the first and second inductive sections comprise two sections of one inductor.

3. The read/write head of claim 1, wherein the first inductance is equal to the second inductance.

4. The read/write head of claim 1, wherein:

the first inductive section comprises a first inductor; and the second inductive section comprises a second inductor.

5. The read/write head of claim 1, wherein a first end of the first inductive section and a second end of the second inductive section are coupled to a switch for selectively coupling the first, and second inductive sections in series and in parallel.

6. The read/write head of claim 1, further comprising:

a third inductive section for coupling in series and in parallel with the first and second inductive sections to modify the inductance of the read/write head; and coupled to a switch for selectively coupling the first, second and third inductive sections in series and in parallel.

7. The read/write head of claim 6, wherein:

the first inductive section and the third inductive section are coupled in series with each other, and coupled in parallel with the second inductive section responsive to a write operation; and the first, second, and third inductive sections are coupled in series responsive to a read operation.

8. The read/write head of claim 6, wherein the inductance of the second inductive section is equal to the inductance of the sum of the inductance of the first inductive section and the inductance of the third inductive section.

9. The read/write head of claim 6, wherein the first inductive section, the second inductive section, and the third inductive section comprise three sections of one inductor.

10. The read/write head of claim 6, wherein:

the first inductive section comprises a first inductor;

the second inductive section comprises a second inductor; and the third inductive section comprises a third inductor.

11. A disc drive comprising:

a write driver for writing to a storage medium having a first and second output;

a read amplifier for reading from a storage medium having a first and second differential input;

a read/write head for reading and writing to a storage medium, the read/write head having:
  a first inductive section having a first inductance and having a first end coupled to the first differential input of the read amplifier; and
  a second inductive section, having a second inductance and having a first and second end coupled to the first and second outputs of the write driver and a second end coupled to the second differential input of the read amplifier; and a switch for coupling the first inductive section in parallel with the second inductive section during a write operation and for coupling the first inductive section in series with the second inductive section during a read operation.

12. The read/write head of claim 11, wherein the first inductive section and the second inductive section comprise two sections of one inductor.

13. The read/write head of claim 11, wherein:

the first inductance is equal to the second inductance.

14. The read/write head of claim 11, wherein:

the first inductive section comprises a first inductor; and the second inductive section comprises a second inductor.

15. The read/write head of claim 11, wherein the switch is a transistor.

16. The read/write head of claim 11, further comprising a third inductive section for coupling in series and in parallel with the first and second inductive sections to modify the inductance of the read/write head.

17. The read/write head of claim 16, further comprising a second switch for coupling the third inductive section in parallel with the first and second inductive sections during a write operation, and for coupling the first, second, and third inductive sections in series during a read operation.

18. The read/write head of claim 16, wherein the first, second, and third inductances are equal.

19. The read/write head of claim 16, wherein the second inductance is equal to sum of the first inductance and the third inductance.

20. The read/write head of claim 16, wherein the first inductive section, the second inductive section, and the third inductive section comprise three sections of one inductor.

21. The read/write head of claim 16, wherein:

the first inductive section comprises a first inductor;

the second inductive section comprises a second inductor; and the third inductive section comprises a third inductor.

22. A method of programming the inductance of a read/write head in a recording and retrieval system, the read/write head having a first and second inductive sections, the method comprising:

determining the operating state of the recording and retrieval system;

coupling the first and second inductive sections in parallel responsive to a write operation; and, coupling the first and second inductive sections in series responsive to a read operation.

23. The method of claim 22, wherein:

the recording and retrieval system further comprises a switch having a first end coupled to one end of the first inductive section, a second end coupled to one end of the second inductive section, and a control element; and the step of coupling the first and second inductive sections in parallel comprises closing the switch responsive to a first logic state on the control element; and the step of coupling the first and second inductive sections in series comprises opening the switch responsive to a second logic state on the control element.

* * * * *